US007053586B2

(12) United States Patent
Jones

(10) Patent No.: US 7,053,586 B2
(45) Date of Patent: May 30, 2006

(54) BRUSHLESS REPULSION MOTOR SPEED CONTROL SYSTEM

(75) Inventor: William M. Jones, Hunting Valley, OH (US)

(73) Assignee: Dynamotors, Inc., Warrensville Hts., OH (US)

( * ) Notice: Subject to any disclaimer, the term of this patent is extended or adjusted under 35 U.S.C. 154(b) by 0 days.

(21) Appl. No.: 10/977,268

(22) Filed: Oct. 29, 2004

(65) Prior Publication Data

US 2005/0093504 A1    May 5, 2005

Related U.S. Application Data

(60) Provisional application No. 60/517,256, filed on Nov. 4, 2003.

(51) Int. Cl.
*H02P 5/28* (2006.01)
(52) U.S. Cl. ............... 318/725; 318/811; 318/254; 318/138; 318/439
(58) Field of Classification Search ............... 318/725
See application file for complete search history.

(56) References Cited

U.S. PATENT DOCUMENTS

| | | | | | |
|---|---|---|---|---|---|
| 3,579,240 | A | * | 5/1971 | Deming | 361/182 |
| 3,623,101 | A | * | 11/1971 | Grebe et al. | 342/450 |
| 3,678,354 | A | * | 7/1972 | Kitanosono et al. | 318/294 |
| 4,277,976 | A | * | 7/1981 | Mueller et al. | 73/457 |
| 4,353,016 | A | * | 10/1982 | Born | 318/254 |
| 4,531,079 | A | * | 7/1985 | Muller | 318/254 |
| 4,584,505 | A | * | 4/1986 | Chung et al. | 318/254 |
| 4,684,860 | A | * | 8/1987 | Heyraud et al. | 318/696 |
| 4,814,704 | A | * | 3/1989 | Zerrien et al. | 324/207.12 |
| 4,893,007 | A | * | 1/1990 | Stannow et al. | 250/231.13 |
| 5,103,225 | A | * | 4/1992 | Dolan et al. | 341/13 |
| 5,424,625 | A | | 6/1995 | Haner | |
| 5,686,805 | A | | 11/1997 | Haner | |
| 5,689,261 | A | * | 11/1997 | Mehta et al. | 341/173 |
| 5,936,374 | A | * | 8/1999 | Haner | 318/725 |
| 6,049,187 | A | * | 4/2000 | Haner | 318/725 |
| 6,108,488 | A | * | 8/2000 | Haner | 388/811 |
| 6,109,123 | A | * | 8/2000 | Baskis et al. | 74/89.1 |

(Continued)

FOREIGN PATENT DOCUMENTS

FR    2 510 836    7/1981

OTHER PUBLICATIONS

Graf, Rudolf F., Modern Dictionary of Electronics, 1999, Butterworth-Heineman, p. 36.*

*Primary Examiner*—David Martin
*Assistant Examiner*—Robert Horn
(74) *Attorney, Agent, or Firm*—Fay, Sharpe, Fagan, Minnich & Mckee, LLP

(57) ABSTRACT

A system for controlling the speed of a brushless repulsion motor having a series of switches mounted on a rotating armature for shorting circumferentially spaced armature coils comprising first stationary signaling means and a plurality of rotating detectors for activating said switches; second stationary signaling means for speed control; a plurality of markers on the rotating armature; a speed detector for detecting the speed of the rotating markers and generating a speed feedback signal; means for generating a speed command signal; an error calculator for comparing the speed feedback and speed command signals and generating an error signal; and a controller for controlling the signaling means based on the error signal.

18 Claims, 12 Drawing Sheets

U.S. PATENT DOCUMENTS

| | | | |
|---|---|---|---|
| 6,129,528 A * | 10/2000 | Bradbury et al. | 417/423.1 |
| 6,140,729 A * | 10/2000 | Pollock et al. | 310/166 |
| 6,693,422 B1 * | 2/2004 | Lutz | 324/207.2 |
| 6,784,807 B1 * | 8/2004 | Petite et al. | 340/870.02 |
| 6,850,029 B1 * | 2/2005 | Pollock et al. | 318/727 |
| 6,864,803 B1 * | 3/2005 | Tang et al. | 340/870.16 |

* cited by examiner

BRUSHLESS REPULSION MOTOR SPEED CONTROL SYSTEM

This application claims priority from U.S. Provisional Application Ser. No. 60/517,256, filed on Nov. 4, 2003.

FIELD OF THE INVENTION

The present invention relates generally to brushless repulsion motors and, more particularly, to an improved system for controlling the speed of a brushless repulsion motor.

INCORPORATION BY REFERENCE

A brushless repulsion (BLR) motor generally includes a series of armature-mounted switches for selectively shorting circumferentially spaced armature coils when the coils reach a particular angle with respect to the flux of the stator. Normally, each coil includes a detector for shorting the coils at the predetermined angular position. Such a motor is shown in Haner, U.S. Pat. No. 5,686,805, which is incorporated by reference herein. Details of the operation of the brushless repulsion motor are known in the art and disclosed in this U.S. patent.

Haner, U.S. Pat. No. 5,424,625, teaches how to construct a BLR motor and how to regulate its speed by closing armature switches in appropriate rotational positions. Two other Haner patents, U.S. Pat. Nos. 6,049,187 and 6,108,488, teach means of setting and maintaining the speed when load or other conditions change by using a counter mounted on the armature (or rotor) to open and close switches at a set frequency. These three Haner patents are also incorporated by reference herein.

BACKGROUND OF THE INVENTION

As described in U.S. Pat. No. 5,424,625, for example, the BLR motor is constructed almost like a universal motor used in hand drills, etc. Its stator consists of one or more salient poles whose copper windings are connected directly to the two legs of a single phase, AC line, just like a universal motor. A BLR motor with three pairs of stator poles runs on three-phase power. The armature consists of slotted steel laminations stacked on a shaft. Copper wire is wound into each slot, over the stack end and back into the slot on the opposite side. The number of turns and the wire size vary with the performance desired. The two ends of each coil are connected by a switch, such as a triac or pair of transistors, thus forming an electric circuit.

When the stator windings are connected to an AC line, magnetic flux builds up and collapses with the line current. This flux passes directly through the armature and induces a voltage potential on each armature coil. When a coil's switch is closed, the current flows in that coil as a result of the applied voltage. This produces opposing magnetic flux and thus torque and rotation. When the switch is open current cannot flow and no torque is produced.

In a two-pole BLR motor, torque is produced in a clockwise direction when a coil is "on" in a 90 degree sector on one side of a stator pole (the positive torque sector). When turned on in the negative torque sector on the other side of the pole, torque is produced in the opposite direction. So, in a two-pole motor, each coil passes through two positive and two negative torque sectors per revolution. Of course, only the positive torque or the negative torque sectors are activated at any one time.

The switches can be opened or closed at will by stationary signal means. The signals can be RF, magnetic, sonic, light, etc. For example, an inexpensive and reliable means is a curved array of infrared light emitting diodes (LEDs) mounted on the motor end-bell. These can be illuminated individually or together. On the rotating armature there is a photo-detector associated with every coil. When a detector "sees" an illuminated LED it closes its switch, which produces current in the coil and flux and torque. By lighting the LEDs in the negative torque sector, reverse rotation can be achieved.

When rotating clockwise, lighting only a single LED when the coil has almost completed its arc in the positive torque sector produces little torque and speed. By lighting the entire array, each switch is turned on during its full arc and therefore develops maximum power and speed. Current in an armature coil is highest when the coil is aligned with the stator pole and cuts the maximum number of flux lines. It falls to zero as the coil rotates 90 degrees and leaves that sector. Therefore, switches are generally turned off at or near the end of a sector in order to break minimum current and achieve the maximum efficiency.

However, when the coil is thus aligned, all the force is directed along the line from one pole to the other and produces no rotational torque. As the coil rotates it begins to produce torque and reaches its most effective torque producing position at 90 degrees, exactly where the current is zero. The actual torque produced at each rotational angle by the combination of these phenomena and other factors is an asymmetrical curve. It rises sharply from zero at the high current-low torque position (hard neutral) to a peak and then decreases more gradually as it moves 90 degrees toward the end of the positive torque sector (soft neutral), where it again becomes zero.

At higher speeds the dynamic interaction between the rotating and stationary magnetic fields tends to shift both the optimum turn-on and turn-off points. As a result, the positive torque sector extends to beyond the 90 degree static limit. This means that a lighted LED at the end of a sector may, under different conditions, produce either positive or negative torque. Therefore, to produce optimum torque and efficiency a speed control scheme must have the flexibility to handle this shift.

Thus, there is a need for a system that improves the performance, reliability and cost of a speed-controlled BLR motor. Such improvements include an internal speed and position sensor, mechanical refinements and electronic control means based on timing.

BRIEF DESCRIPTION

In accordance with one embodiment of the present invention, there is provided a system for controlling the speed of a brushless repulsion motor having a series of switches mounted on a rotating armature for shorting circumferentially spaced armature coils. The system comprise first stationary signaling means and a plurality of rotating detectors for activating said switches; second stationary signaling means for speed control; a plurality of markers on the rotating armature; a speed detector for detecting the speed of the rotating markers and generating a speed feedback signal; means for generating a speed command signal; an error calculator for comparing the speed feedback and speed command signals and generating an error signal; and a controller for controlling the signaling means based on the error signal.

In accordance with another embodiment of the present invention, there is provided a system for controlling the speed of a brushless repulsion motor having a series of switches mounted on a rotating armature for shorting circumferentially spaced armature coils. The system comprises a controller mounted on the armature for controlling the switches; a plurality of stationary markers on the stator of the motor; and signaling means and corresponding detecting means on the armature for providing a speed feedback signal to the controller.

In accordance with another embodiment of the present invention, there is provided a system for controlling the speed of a brushless repulsion motor having a stator and a series of switches mounted on a rotating armature for shorting circumferentially spaced armature coils. The system comprises a plurality of markers on the armature; a signaling source directed to the markers; a detector for detecting the markers and generating a speed feedback signal; and a controller for controlling the switches.

In accordance with another embodiment of the present invention, there is provided a speed control system for a brushless repulsion motor having a stator, an armature, and a series of coil switches for shorting a succession of armature coils. The speed control system comprises a position marker on the armature for determining armature coil position; first signaling means; a position detector for detecting the armature coil position marker via the first signaling means; a plurality of markers on the armature for determining armature speed; second signaling means; a speed detector for detecting the speed of the armature via the second signaling means; and a timer for controlling the speed of the armature and the desired speed of the motor at the precise time as determined by the position of one of the armature coils.

In yet another embodiment of the present invention, there is provided a system for controlling the speed of a brushless repulsion motor having a series of switches mounted on a rotating armature for shorting circumferentially spaced armature coils. The system comprises first stationary signaling means and a plurality of rotating detectors for activating said switches; an encoder for detecting the speed and position of the coil switches and generating a speed feedback signal and a position feedback signal; generating means for generating a speed command signal; an error calculator for comparing the speed feedback and speed command signals and generating an error signal; and a timer for controlling the signaling means based on the error signal.

DETAILED DESCRIPTION OF THE PREFERRED EMBODIMENTS

Figure 1:
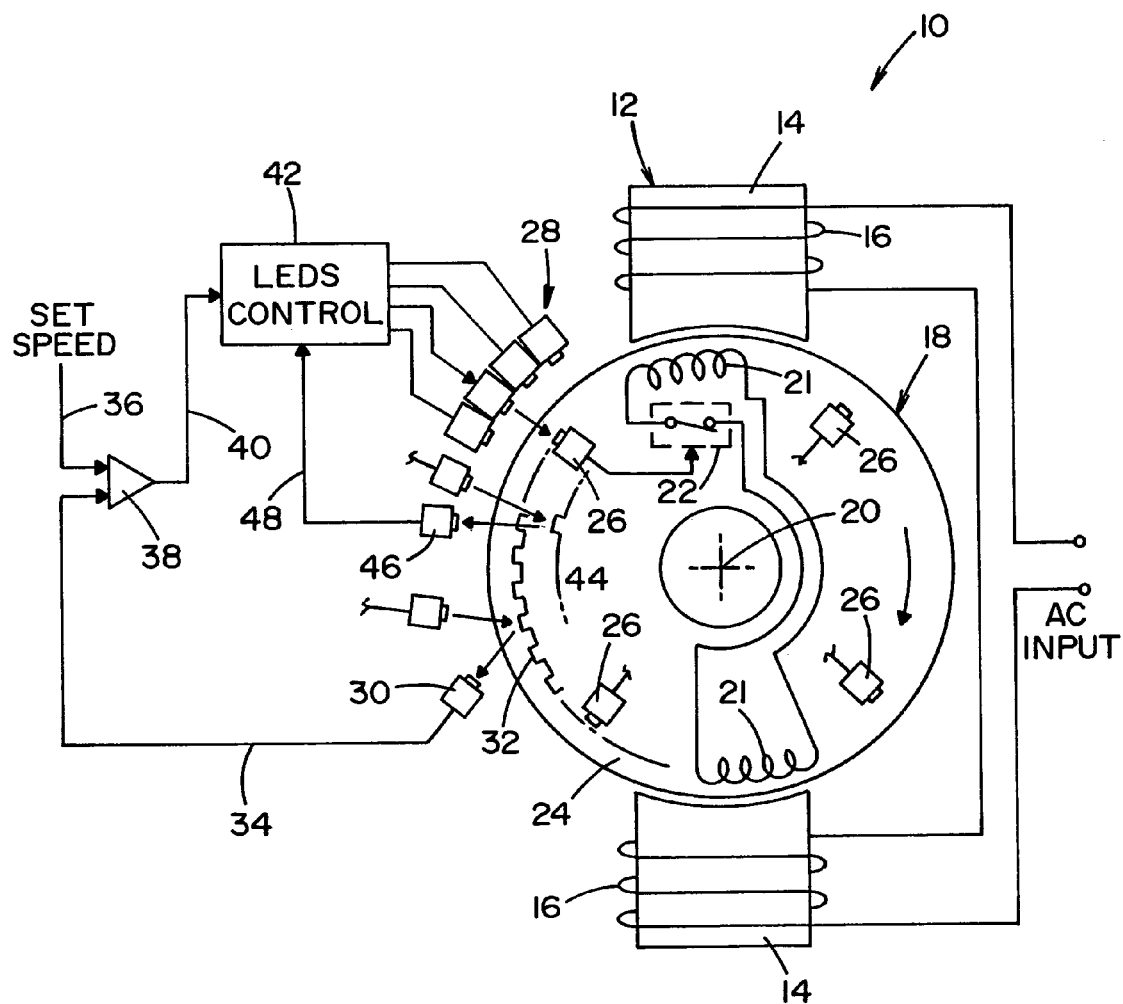
FIG. 1 is a diagrammatical view of a two-pole brushless repulsion motor with a speed control system constructed in accordance with the present invention.

Reference will now be made in detail to the preferred embodiments of the present invention, examples of which are illustrated in the accompanying drawings, wherein like reference numerals to like elements throughout.

A BLR motor 10 with an improved speed control system is illustrated in FIG. 1, shown in a view looking axially from an electronic commutator end. The BLR motor 10 in the illustrated example is a single-phase two-pole repulsion motor. A motor stator 12 comprises a pair of diametrically opposed magnetic poles 14 having field windings 16 that typically are connected to 60 HZ single-phase utility power and produce a magnetic field. The stator 12 can be constructed in essentially the same manner as in a conventional universal series motor or a repulsion motor. A rotor (or armature) 18 of the BLR motor 10 can be constructed essentially in the same manner as a conventional universal series motor with certain exceptions or modifications discussed below. The rotor 18 is supported for rotation about a central axis 20 by axially spaced bearings mounted on opposite ends of the stator 12 in a conventional manner. The rotor 18 has a plurality of axial or longitudinal slots (not shown) on its periphery into which are fitted a plurality of generally longitudinal coils 21 terminated on commutator segments or bars. Electrical brushes found in conventional repulsion motors or in universal series motors are eliminated from the construction of the BLR motor 10. Rather, the BLR motor 10 includes electronic means on the rotor 18 to short the ends of the rotor winding coils 21, eliminating the need for conventional electrical brushes to do the same.

The commutator segments are typically arranged in diametrically opposed pairs. Associated with each pair of segments is an electronic switch circuit 22 mounted on a printed circuit board 24 on the rotor 18. At appropriate times in the rotation of the rotor 18, the electronic switches 22 will be individually closed or rendered conductive to short, i.e. electrically connect their respective segments together. With the field windings 16 energized and appropriate commutator segments shorted, the effect is to develop torque and rotation between the rotor 18 and stator 12. A typical electronic switch 22 comprises a pair of power MOSFET transistors and a triggering device (or detector) 26 such as a phototransistor. When the detector 26 is illuminated by a suitable light source 28, such as an array of LEDs, it switches on and, in turn, switches on the power transistors through their gates, placing them in a conductive state.

The electronic switch 22 is replicated for each pair of segments, but for clarity in the drawings, this replication is not shown. It will be understood that the electronic switches 22 and related energizing circuitry for all of the segment pairs are suitably fixed to the circuit board 24 of the rotor 18 so that the same rotates in unison with the rotor 18. For heat transfer or other reasons, the components of the electronic switch 22 can be carried on the rotor 18 outside of the stator 12 by interconnecting the same to the segments with wires that run along the rotor shaft, in a slot or central hole, through the associated conventional shaft bearing.

When speed begins to deviate from the desired value due to changes in the load or line voltage, heating etc., a speed sensor and a closed-loop speed feedback system can automatically reset the turn-on point to maintain set speed as described below.

Thus, in this embodiment, the BLR motor 10 includes an improved speed control system in accordance with the present invention. The speed control system is essentially an inexpensive internal feedback means, as shown in FIG. 1. Instead of using a separate, externally mounted and wired tachometer, resolver or encoder, the BLR motor's unique rotating electronic printed circuit board 24 is used to sense speed and position inexpensively. A stationary magnetic pickup or photo-transmitter speed detector 30 is used to sense an array of markers 32 on the rotating PC board 24. These markers 32 can be magnets or alternate reflective and non-reflective bars, and they can be placed either flat on the rotating and stationary surfaces or on the peripheries, which eliminates the effect of spacing variations due to end-play of the rotor 18 and wobble of the circuit board 24. Although not shown, the markers 32 can also be mounted in an upright position circumferentially around the printed circuit board 24 with the detector 30 mounted on the printed circuit board 24 within the periphery of the markers 32.

A speed feedback signal 34 from the speed detector 30 can then be compared with a speed command signal 36 by means of an error calculator 38, and the difference (or error signal) 40 may be used by a standard LED controller 42 to turn on more or fewer LEDs 28 in the positive torque sector to correct the speed. Of course, the switches 22 are opened or closed by the LEDs 28 as described in the Haner patents described above, for example. Thus, when a detector 26 "sees" an illuminated LED 28 it closes its corresponding switch 22, which produces current in the coil 21, along with flux and torque. And by lighting the LEDs 28 in the negative torque sector, reverse rotation can be achieved.

Another single position marker 44, or one at each coil 21, can be designated to indicate the exact coil position, which is useful for many speed control approaches. In particular, a position detector 46 senses the position marker 44 on the rotating board 24 and sends a position feedback signal 48 to the LED controller 42 to help maintain the set speed.

Figure 2:
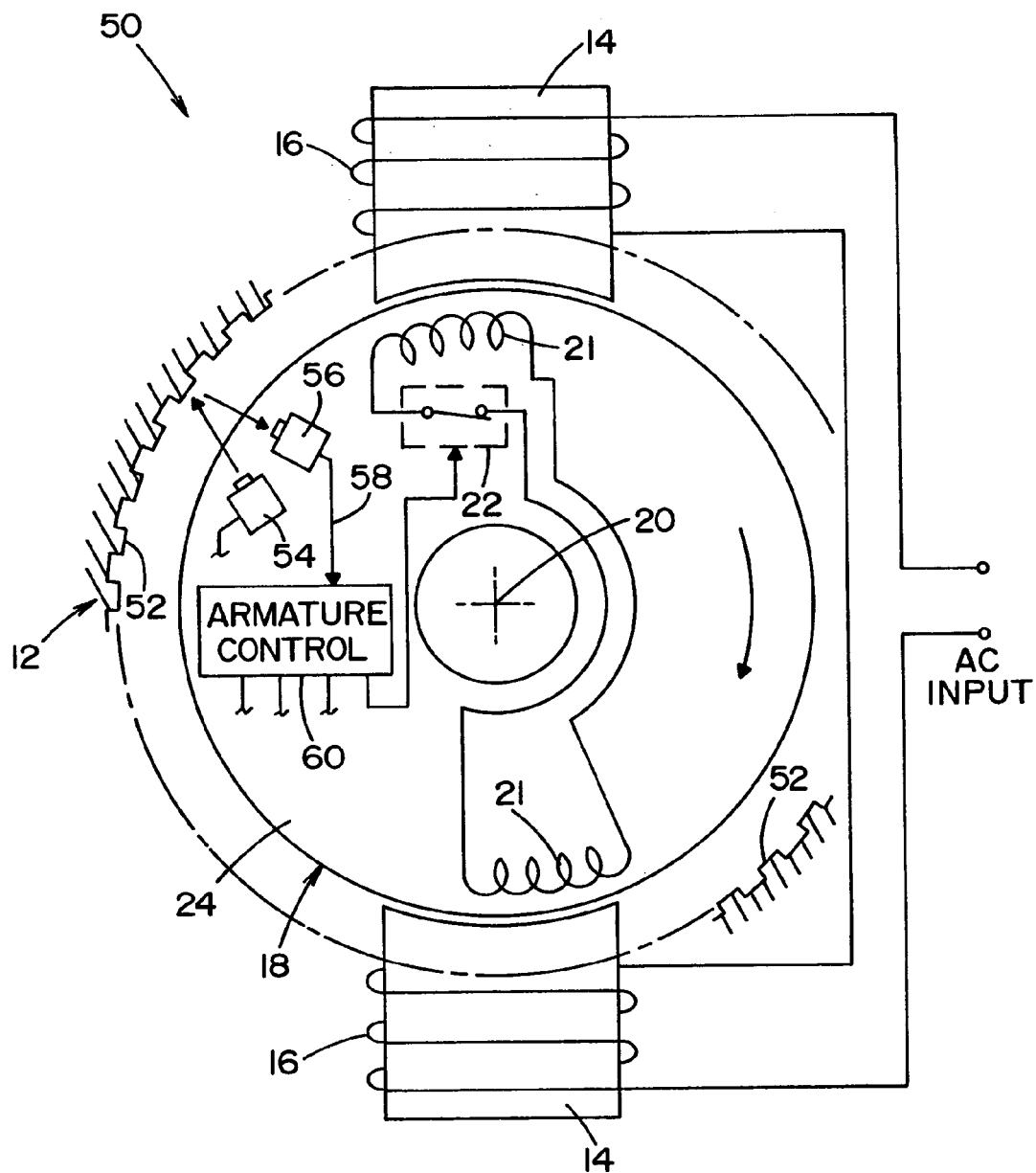
FIG. 2 is a view similar to FIG. 1 showing a different speed control system.

Reference is now made to FIG. 2 where a BLR motor 50 having an armature-mounted speed control system is shown. The BLR motor 50 is similar in arrangement to that described in connection with FIG. 1. However, in this embodiment, the BLR motor 50 is constructed with an array of stationary markers 52, such as magnets or alternate reflective and non-reflective bars, on the stator 12. Light from a signaling source 54 such as an LED is reflected back by the markers 52 and detected by a magnetic pickup or photo-transmitter detector 56 mounted on the rotor 18. The detector 56, in turn, provides a feedback signal 58 to armature-mounted control 60, which controls the switch 22, such as in the approaches described in the Haner patents cited earlier and incorporated by reference. It is to be understood, however, that other types of signaling methods could be used including RF signals.

It is to be appreciated by those skilled in the art that this novel concept can also be employed with other types of speed control for the BLR motor, such as varying the input voltage to the field or pulsing the LEDs in phase with the line frequency.

While LEDs are generally reliable and inexpensive in controlling the speed of BLR motors, their small size, variable characteristics, as well as other factors may limit their use for precise speed control in some cases. Given their small size (only ⅛"), only about 16 LEDs can be inserted in the 90 degree positive torque sector in a 4" diameter two-pole motor. Of these, only 12 are used to control speed, as the others are reserved to produce peak torque for short periods of overload. In a four-pole motor with a 45 degree positive torque sector, this is reduced to 8 and 6 devices, respectively. Therefore, the speed can be set only in coarse steps rather than being continuously variable, which is the standard for adjustable speed drives.

Figure 3:
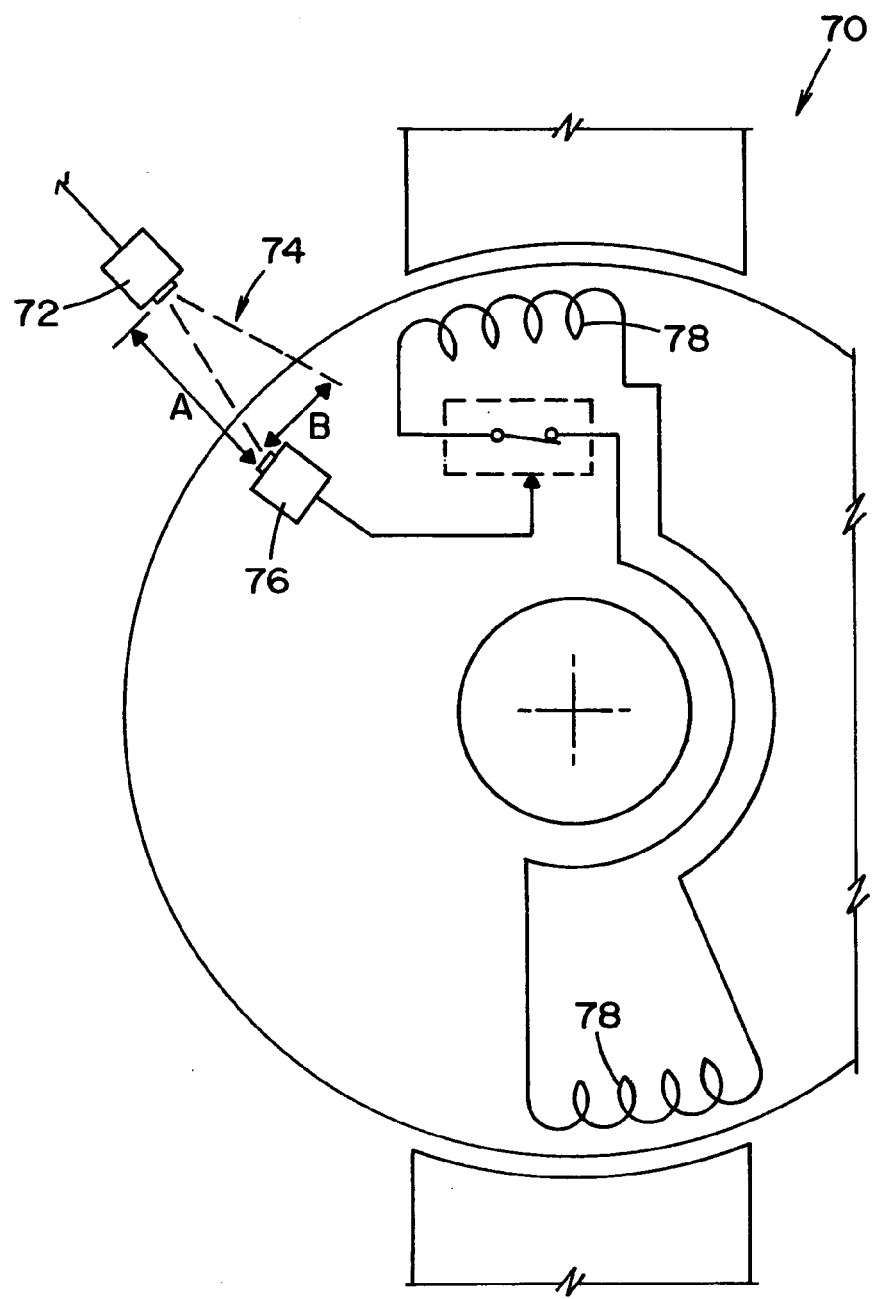
FIG. 3 is a diagrammatical view of a two-pole brushless repulsion motor featuring the cone of light from an LED.
Figure 4:
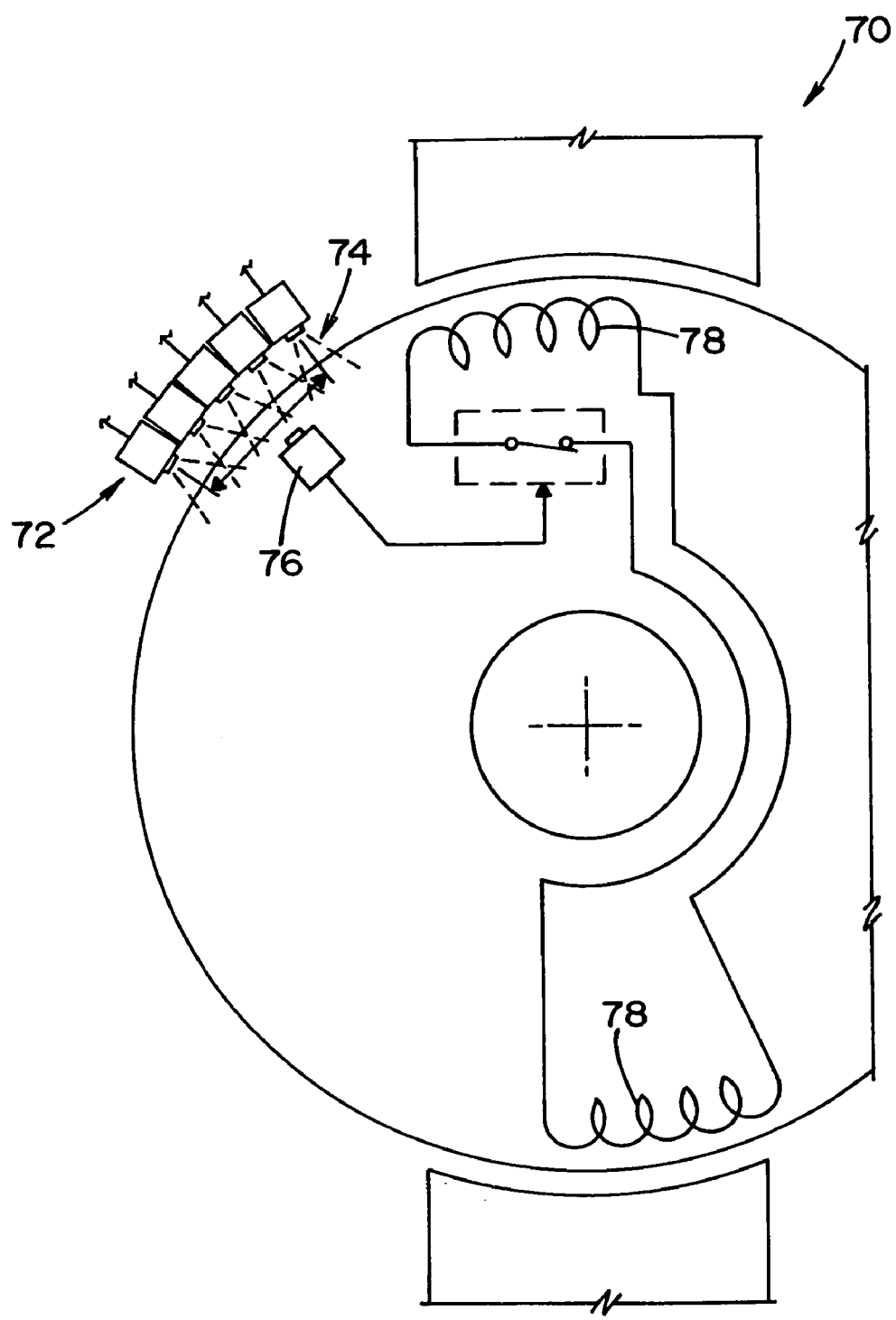
FIG. 4 is a view similar to FIG. 3 showing an array of LEDs and overlapping cones.

Reference is now made FIGS. 3 and 4, where a conventional BLR motor 70 having a speed control system with a number of LEDs 72 as a light source is shown. Each LED 72 produces a cone of light 74 that may create some additional problems. For instance, each LED 72 is spaced a distance A from a detector 76, and each cone 74 has a width B. And, as best seen in FIG. 4, the LEDs 72 must be spread apart to prevent overlap of the cones 74, further reducing the number of speed settings available. Also, the width B of the cone 74 varies with voltage, temperature, time in service and with the distance from the stationary LED 72 to the rotating photo-detector 76. A wider cone 74 would permit the detector 76 to "see" the LED 72 before the coil 78 has rotated to the intended position, thus causing the motor 70 to speed up, while a narrow cone 74 acts in reverse. This problem is accentuated by the fact that each detector 76 also has its own variable cone (not shown). The combination of these factors may make it difficult to achieve accuracy or even repeatability over time using discrete LEDs for position control, even when placed on the periphery to eliminate longitudinal variations. Even with using a closed-loop speed control system such as the one described above, the above limitations may still apply.

However, illuminating alternate LEDs 72 can alleviate the speed precision problem. For example, turning on the #5 LED for the first coil and then the #4 and #5 LEDs for the next three coils will produce an average speed as if an LED #4.25 were available. This will be satisfactory for many applications but the cone variability is still present.

These limitations of resolution and accuracy can be further improved by various mechanical and electronic means. For example, the use of a timer inexpensively eliminates many of the above limitations imposed by use of discrete LEDs to control the speed of a BLR motor. A timer-based speed control system operates by turning on and off signaling means (e.g., LED, RF or other suitable means), thus closing and opening the switches at the precise time when each coil is in exactly the proper position. Therefore, it provides a more accurate control at every switching cycle than that of position control with coarser resolution. The desired spot can be determined using a standard external encoder or the internal device (rotating markers) described above and a timer to determine location. In such a timer-based speed control system, each switch can be turned off either when its photo-detector passes out of the lighted sector or by the position sensor for maximum flexibility, as described more fully below.

Figure 5:
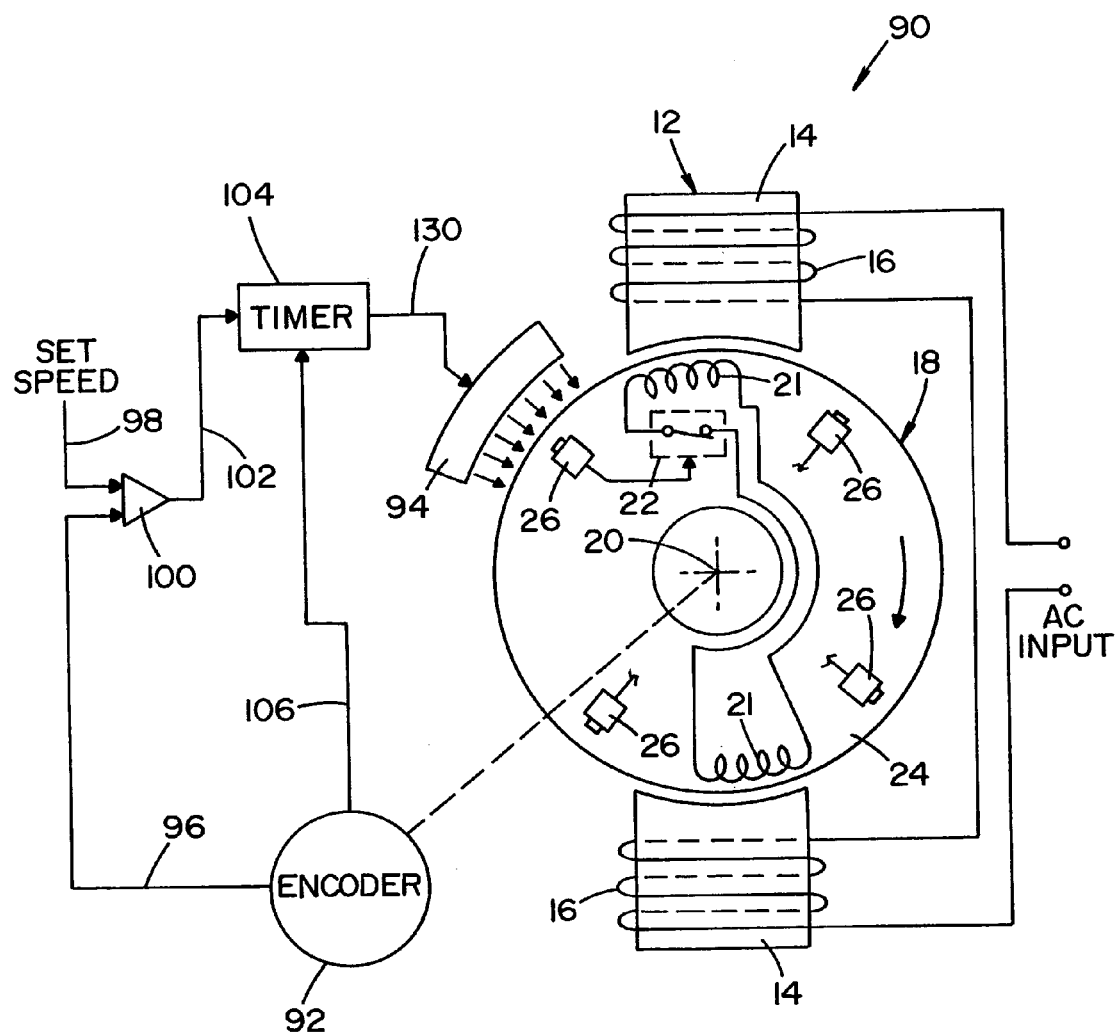
FIG. 5 is a diagrammatical view of a two-pole brushless repulsion motor with an alternative speed control system constructed in accordance with the present invention.

Referring now to FIG. 5, there is shown an alternative BLR motor 90 constructed with the timer-based speed control system. The motor 90 is similar in arrangement to that described in connection with FIG. 1 as it pertains to a stator 12 and rotor 18. The speed control system includes a 1024-line encoder 92 mounted on the rotor 18. The encoder 92 provides 256 control points in a 90 degree positive torque sector, which is 16 times the resolution of speed setting achievable with discrete LEDs (an angular precision of 0.35 degrees vs. 5.62 degrees). This scheme requires only one signaling device 94, such as a continuous arc of light, per sector, but an LED array still works. A speed feedback signal 96 from the encoder 92 can then be compared with a speed command signal 98 by means of an error calculator 100, and the difference (or error signal) 102 may be used by a timer 104 to turn on the signaling source 94 in the positive torque sector earlier or later to correct the speed at the correct time. Additionally, the encoder 92 may provide a position feedback signal 106 to the timer 104. By using the encoder 92 to sense both actual speed and coil position, a closed loop control can then advance or delay the actual turn-on point in the positive torque sector required to maintain a set speed with changing load or other conditions.

If greater precision is required or if it is less expensive to use a coarser encoder, then the desired turn-on point can be extrapolated, based on the measured speed at the last encoder marker (or the average of the last several markers). That is, the timer 104 calculates, based on the set and actual speeds, how far in distance and time beyond the latest encoder pulse the turn-on should occur. It then waits the number of microseconds until the coil 21 has moved precisely to that point when it activates the signaling means. This can provide a 10:1 or even a 100:1 refinement in resolution. For practical purposes, this provides an infinitely variable speed alignment.

Figure 6:
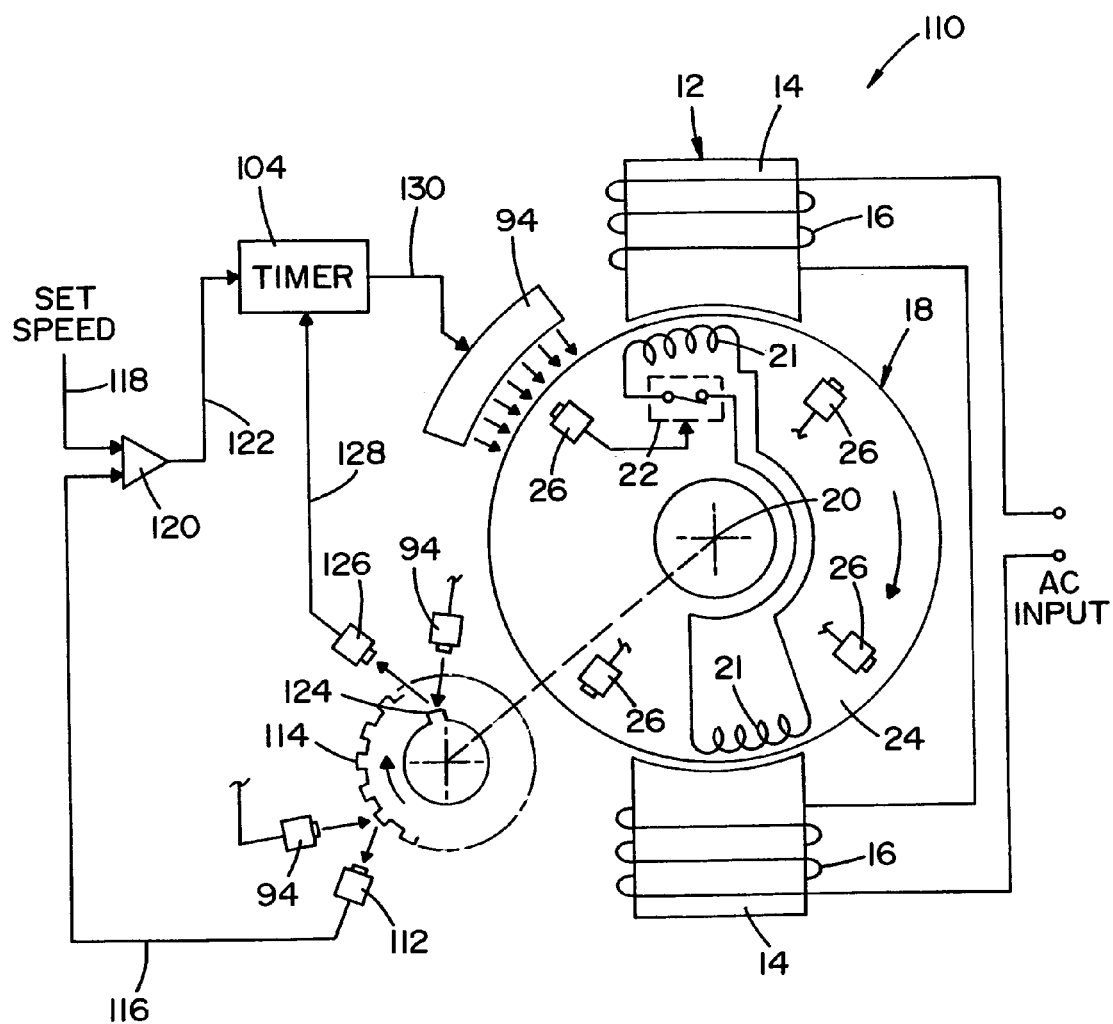
FIG. 6 is a diagrammatical view of a two-pole brushless repulsion motor showing a variation of the speed control system in FIG. 6.

FIG. 6 shows an alternative BLR motor 110. The motor 90 is similar in arrangement to that described in connection with FIG. 6, except that in this embodiment, a stationary magnetic pickup or photo-transmitter speed detector 112 is used to sense an array of markers 114 on the rotating board 24. A speed feedback signal 116 from the speed detector 112 can then be compared with a speed command signal 118 by means of an error calculator 120, and the error signal 122 may be used by the timer 104 to turn on the signaling source 94 in the positive torque sector earlier or later to correct the speed at the correct time. Another single position marker 124, or one at each coil 21, can be designated to indicate the exact coil position. In particular, a position detector 126 senses the position marker 124 on the rotating board 24 and sends a position feedback signal 128 to the timer 104. The timer 104, in turn, sends a control signal 130 to the signaling source 94, which activates the switches 22 via the detectors 26.

The above timing schemes are described as if only one coil were activated at a time. However, in order to achieve maximum power and optimum efficiency, multiple coils must be turned on simultaneously. For example, each coil-end of a four coil rotor spans 45 degrees, so three coils can be on and producing torque at once in the 90 degree or greater positive torque sector in a two-pole motor.

Figure 7:
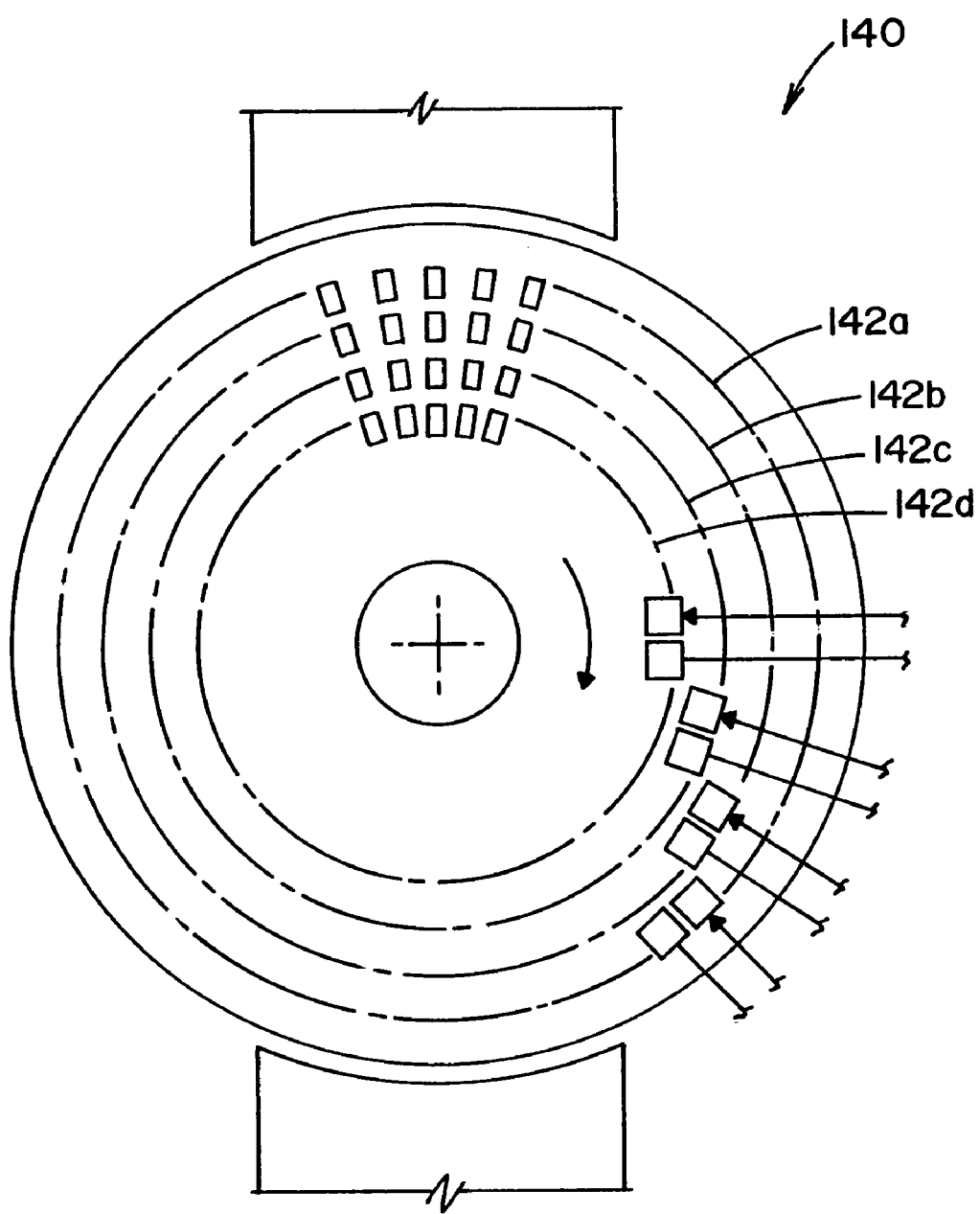
FIG. 7 is a diagrammatical view of a two-pole brushless repulsion motor with a speed control system based on concentric rings.

This can be achieved in several ways, including by using separate light sources, such as concentric LED rings. Referring now to FIG. 7 where an alternative BLR motor 140 is shown. The motor 140 is constructed with concentric LED rings 142a–d, one for each coil. These concentric LED rings 142a–d can give flexible, independent control over 360 degrees.

Figure 8:
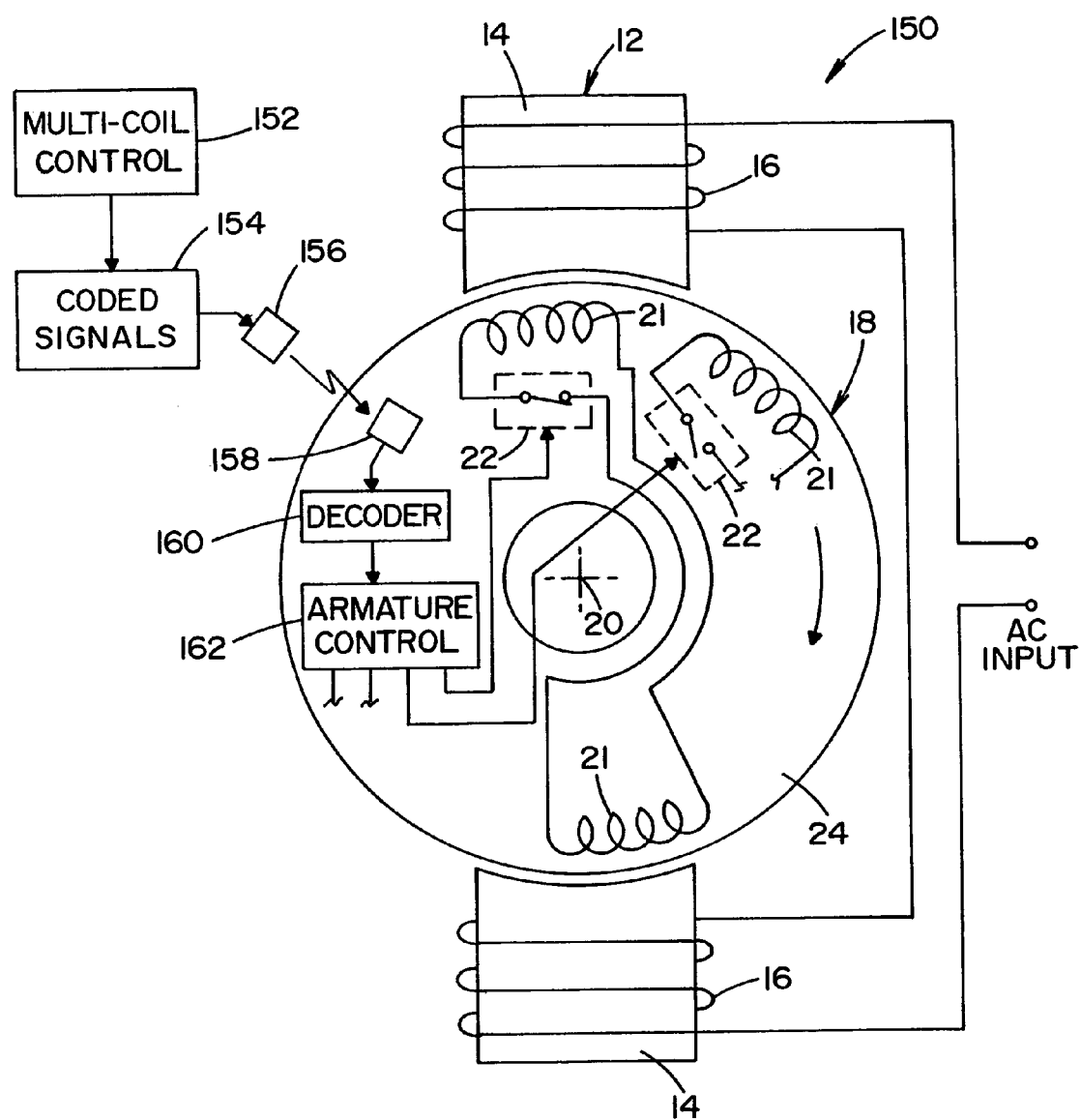
FIG. 8 is a diagrammatical view of a two-pole brushless repulsion motor with an alternative speed control system constructed in accordance with the present invention.

Reference is now made FIG. 8 where an alternative BLR motor 150 is shown. The motor 150 is similar in arrangement to that described in connection with FIG. 1 as it pertains to a stator 12 and rotor 18. More particularly, a multi-coil controller 152 generates coded signals 154 which are transmitted from the stator 12 by an RF transmitter 156 or other means in the form of pulses or distinct frequencies can be received by an RF receiver 158 and decoded by a decoder 160 on the rotor 18. The decoded signals are sent to an armature-mounted control 162 to control the switches 22 as desired. A first signal can cause one of the switches 22 to turn and latch on and the second signal will turn the switch 22 off any desired time/point, thus providing the ability to optimize performance under shifting dynamic conditions.

Figure 9:
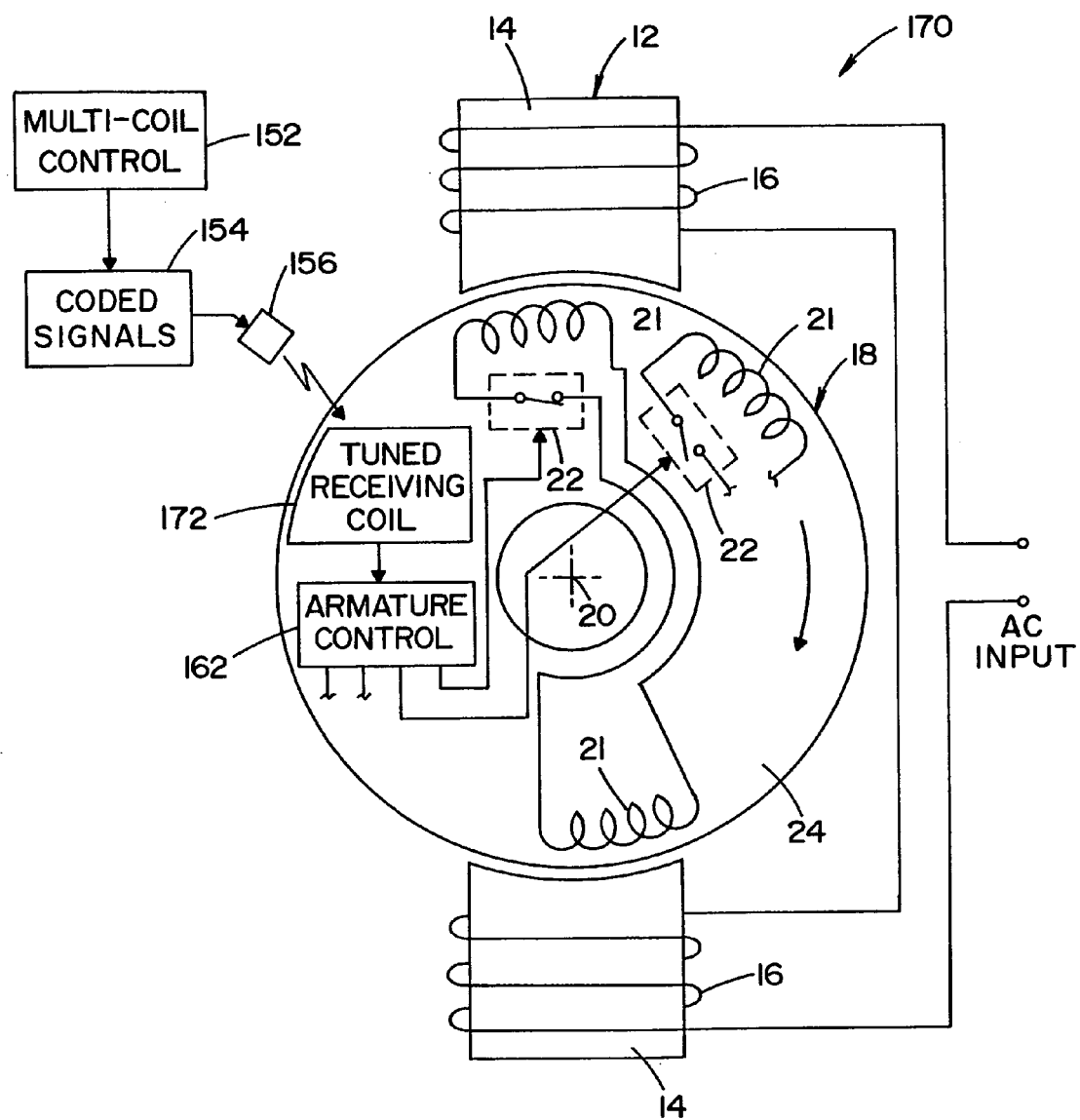
FIG. 9 is a diagrammatical view of a two-pole brushless repulsion motor showing a variation of the speed control system in FIG. 9.

Reference is now made FIG. 9 where an alternative BLR motor 170 is shown. The motor 170 is similar in arrangement to that described in connection with FIG. 8 except that the coded signals 154 are received and decoded by a tuned receiving coil 172 on the rotor 18. Again, the decoded signals are sent to the armature-mounted control 162 to control the switches 21, as desired.

Figure 10:
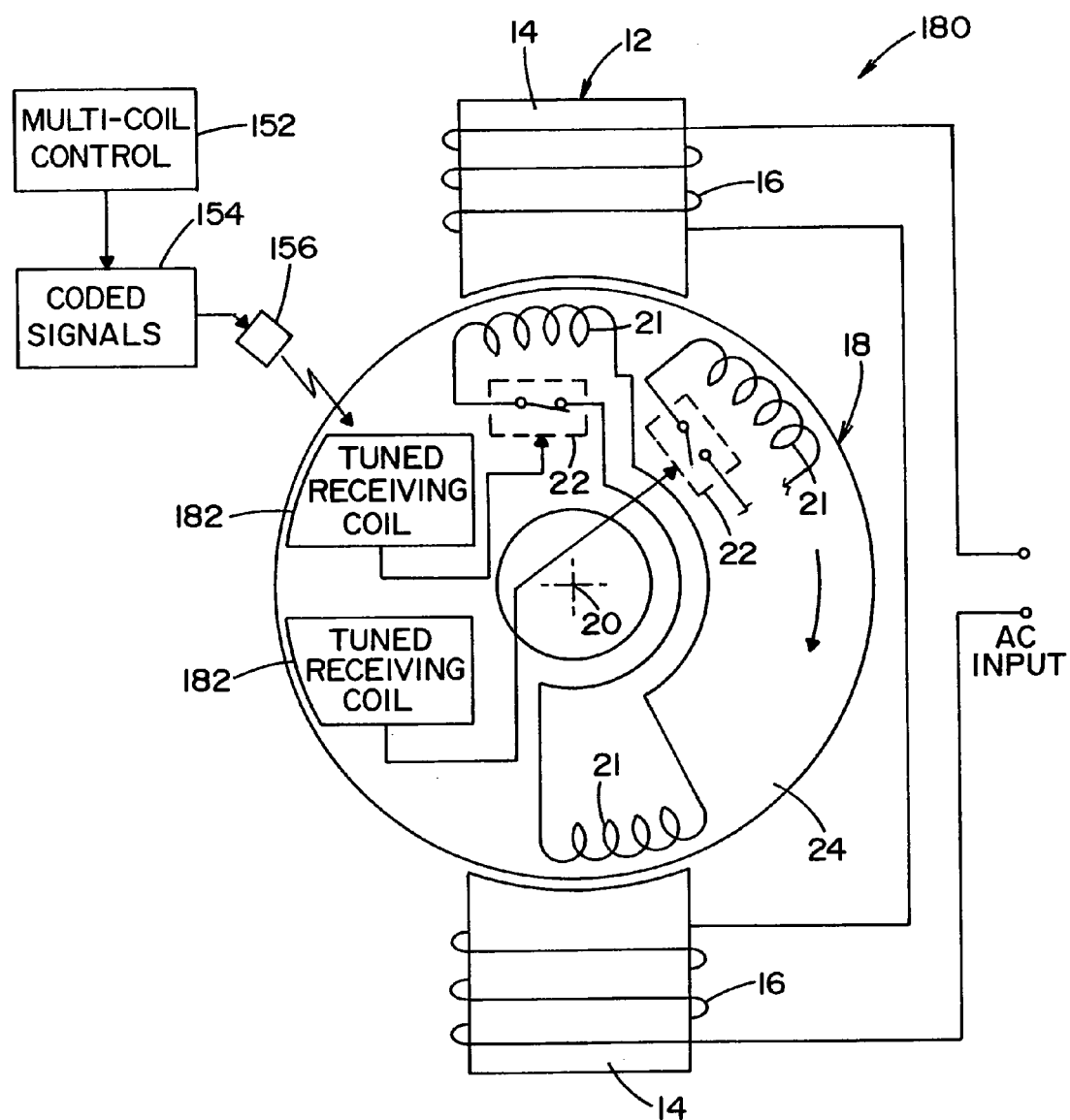
FIG. 10 is a diagrammatical view of a two-pole brushless repulsion motor showing a variation of the speed control system in FIG. 9.

Reference is now made FIG. 10 where an alternative BLR motor 180 is shown. The motor 180 is similar in arrangement to that described in connection with FIG. 9. However, in this embodiment, each switch 22 has a corresponding tuned receiving coil 182 on the rotor 18. Thus, the coded signals 154 are received and decoded by the tuned receiving coils 182.

Figure 11:
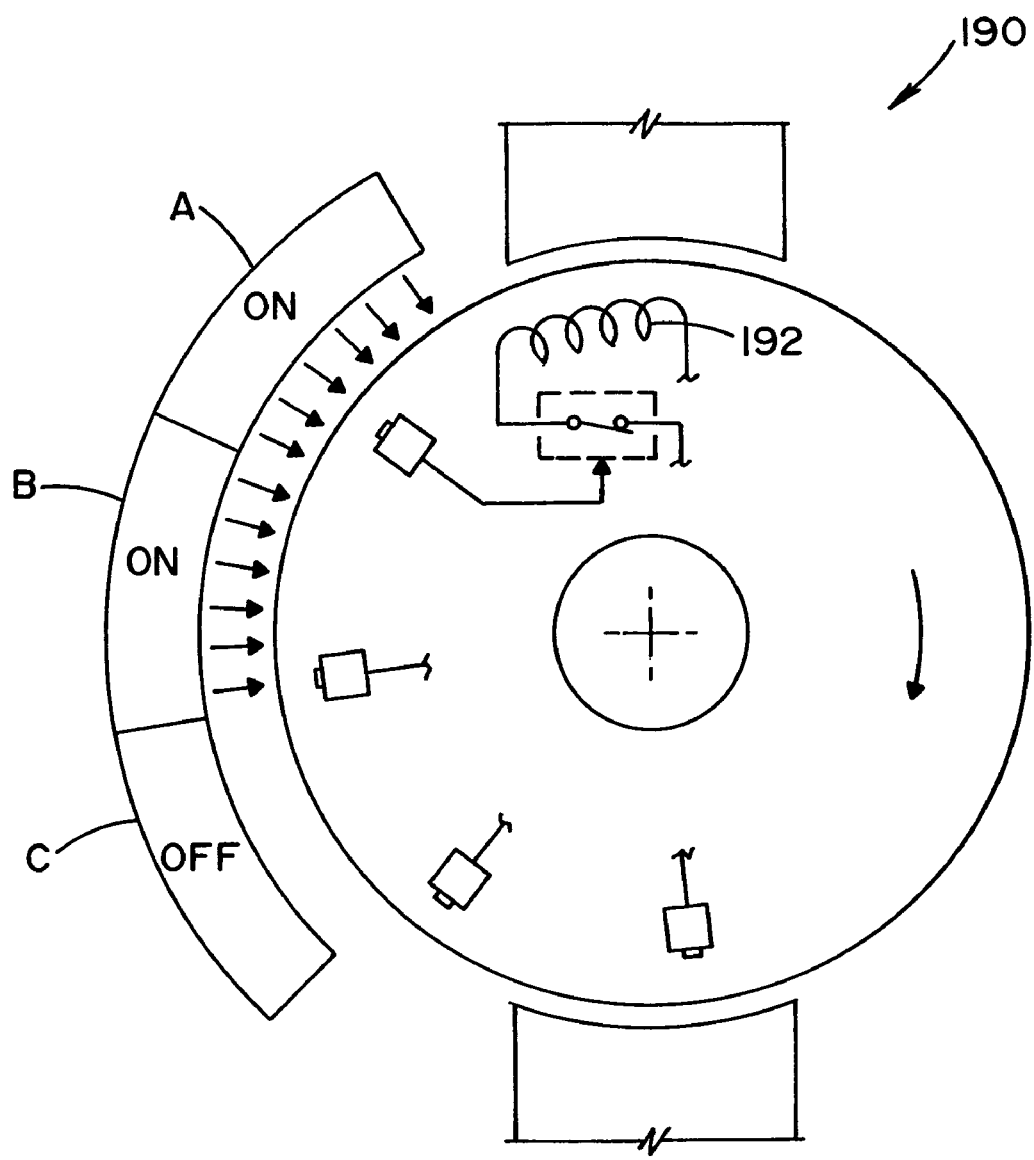
FIG. 11 is a diagrammatical view of a two-pole brushless repulsion motor with an alternative speed control system constructed in accordance with the present invention.

Referring now to FIG. 11 where an alternative BLR motor 190 is shown. In this embodiment, multiple signaling zones in a sector, such as LED arrays A, B, and C provide independent control for the BLR motor 190, which has four coils 192. In such a four-coil motor, three zones, A, B, C, control three possible simultaneously activated coils 192. Each zone may be 35 to 40 degrees to provide more than 90 degrees of control. For example, when minimum power is required, only zone A will be lit at the proper time and so only one coil 192 will be activated. Each activated coil 192 and, if appropriate, the zone A signaling source (i.e., the LEDS) will be turned off at the proper time point as determined by an encoder position sensor.

For more power, the LEDs in zone B will be lit at the proper time and turned off when its active coil (not shown) enters zone A, which will remain lit continuously. Two coils will be activated simultaneously for a period and the coil moving from zone B into A will remain on. To develop maximum power, torque must be applied in the entire positive torque sector. Thus, zone C will be lit to energize each switch 192 as it enters that zone and it will be kept on through the rest of the sector as zones B and A will remain lit all the time.

Figure 12:
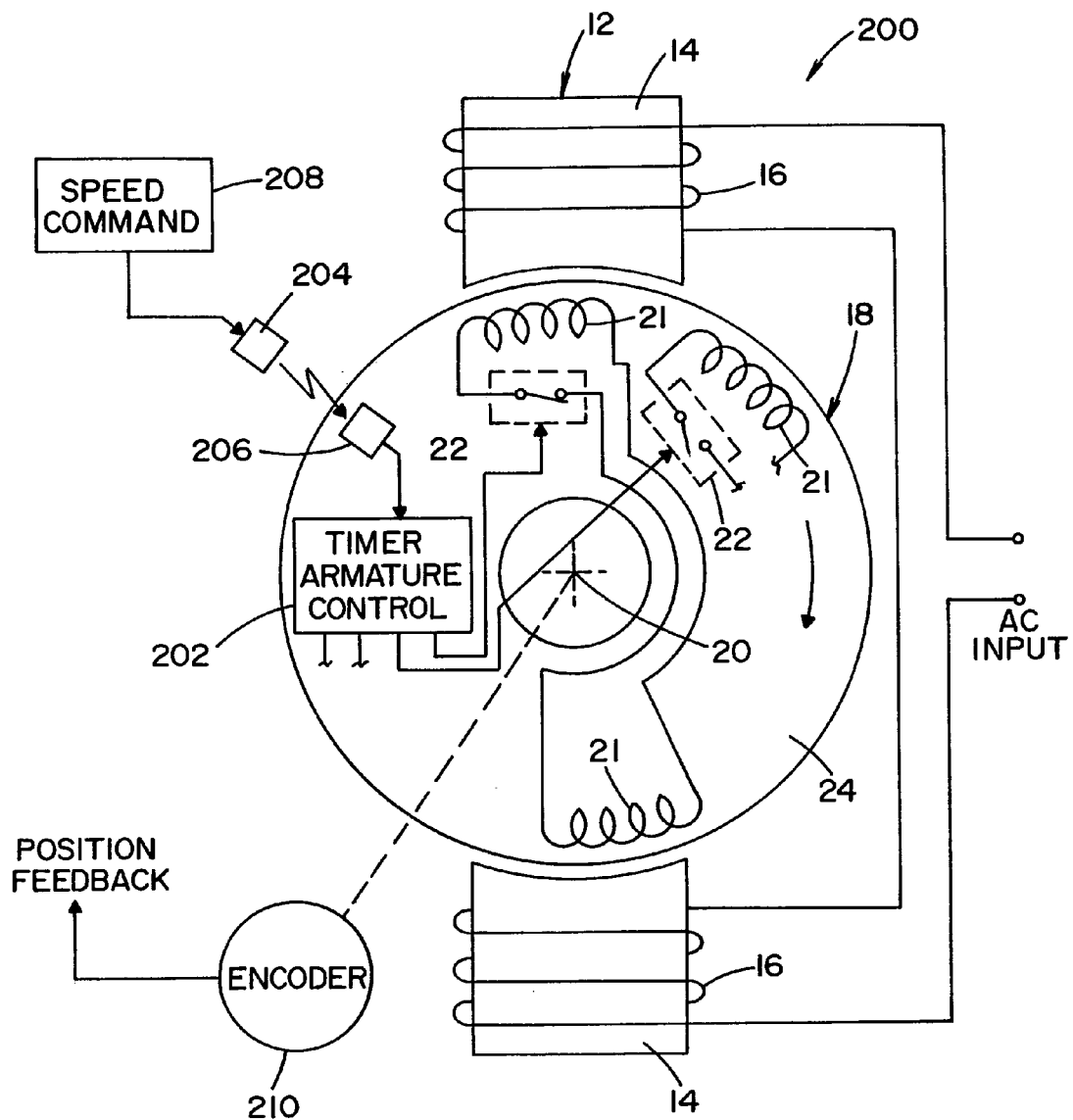
FIG. 12 is a diagrammatical view of a two-pole brushless repulsion motor with an alternative speed control system constructed in accordance with the present invention.

Reference is now made FIG. 12 where an alternative BLR motor 200 is shown. The motor 200 is similar in arrangement to that described in connection with FIG. 1 as it pertains to a stator 12 and rotor 18. In this embodiment, timer control without speed feedback is used. This approach requires discrete signals to control each of several coils 21 as described above. The switches 22 are turned on and off by a timer control means 202 mounted on the rotor 18 at precisely the time interval that coincides with the rotational speed desired times the number of switches required per revolution. In a 2 pole-4 coil motor, this is 8 pulses/revolution, since each coil must be switched on at each pole. At 1800 rpm or 30 revolutions/second it would be 240 pulses/second.

Rotation rate is thus controlled with pulses like a quartz watch. Once the motor is operating at the set speed, it will self-correct without speed feedback if a change occurs. For example, if the load decreases or the voltage increases the motor 200 will tend to speed up. But this will cause the next coil 21 to have moved farther than intended into the positive torque sector by the time the turn-on is signaled. It will therefore be further down the torque-position curve and also in the positive torque sector for a shorter arc than intended, both of which produce less power and slow it down. Or it may actually enter the negative torque sector and produce reverse torque, which will decelerate it even faster.

If the load increases or the voltage drops, then the rotor 18 will momentarily be turning at less than set speed. The next coil 21 will then be turned on when it is less far into the positive torque sector and higher on the torque-position curve than intended and will thus speed up.

The motor 200 will also adjust its rotational rate in the same manner when the speed command is changed. Start-up occurs just like any other increase in set speed. Because the motor 200 may not be as responsive under all circumstances as one with speed feedback, it will be helpful to change commands on a ramped rather than a step basis. Also, although speed feedback is not required, providing position feedback will improve its performance. Knowing the rotor's rotational position enables the timer control means 202 to turn on coils 21 when they are favorably located and to adjust their turn-off to the variable soft neutral point to avoid breaking considerable current.

An accurate, responsive, flexible and inexpensive control can be achieved by modifying three elements described above. First, the timing control means 202 is mounted on the rotor 18 connected directly to all the switches 22 and can tune each one on and off as desired over an extended positive torque sector without the need for photo (or other) detectors associated with each switch 22.

Second, a single transmitter-receiver system, such as an RF transmitter 204 and an RF receiver 206 can send a coded signal from a speed controller 208 on stator 12 to the rotor 18 with commands to the timer 202 to set the speed. It is to be appreciated by those skilled in the art that other transmitter-receiver systems could be used, including light, IR, or other similar systems. This eliminates the need for multiple LEDs and utilizes a very small bandwidth since it operates only when the speed command is changed.

Third, an encoder 210 with the markers on the stator 12 and an emitter-detector (not shown) on the rotor 18 can provide speed and position information to the closed-loop system on the rotor 18 that maintains desired speed.

It is to be appreciated that this approach can also be used without the speed sensor in the manner described above.

Thus, the embodiments of the invention described above provide improved performance, reliability and cost plus great flexibility in designing BLR motors to meet the needs of a wide range of applications. Implementing any of these embodiments with one or more microprocessors and software adds even greater versatility.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

Having thus described the invention, the following is claimed:

1. A system for controlling the speed of a brushless repulsion motor having a stator and a rotating armature with a series of switches mounted on a printed circuit board on the rotating armature for shorting circumferentially spaced armature coils, the system comprising:
   LED signaling means and a plurality of rotating detectors for activating and deactivating the switches;
   a first stationary photo transmitter on the motor for sending a signal to be used for speed control;
   a plurality of alternating reflective and non-reflective markers on the PC board of the rotating armature for speed control;
   a first stationary photo detector on the motor for detecting the speed of the rotating markers and generating a speed feedback signal;
   generating means on the motor for generating a speed command signal;
   an error calculator on the motor for comparing the speed feedback and speed command signals and generating an error signal;
   an LED controller on the motor for controlling the LED signaling means based on the error signal, wherein the LED controller is operative to adjust the LED signaling means in the positive or negative torque sector to correct the speed of the rotating armature;
   a second stationary photo transmitter on the motor for sending a signal to be used for position control;
   a position marker on the PC board of the rotating armature; and
   a second stationary photo detector on the motor for detecting the position marker to determine the position of the armature coils and sending a position feedback signal to the controller for maintaining the set speed.

2. The system defined in claim 1, further comprising: at least one position marker associated with each coil.

3. The system defined in claim 1, wherein the markers are mounted flat on the armature.

4. The system defined in claim 1, wherein the markers are mounted on the peripheries of the armature.

5. A system for controlling the speed of a brushless repulsion motor having a stator and a rotating armature with a series of switches mounted on a printed circuit board on the rotating armature for shorting circumferentially spaced armature coils, the system comprising:
   LED signaling means and a plurality of rotating detectors for activating and deactivating the switches;
   a plurality of magnetic markers on the PC board of the rotating armature for speed control;
   a first stationary magnetic pickup means on the motor for detecting the speed of the rotating markers and generating a speed feedback signal;
   generating means on the motor for generating a speed command signal;
   an error calculator on the motor for comparing the speed feedback and speed command signals and generating an error signal;
   an LED controller on the motor for controlling the LED signaling means based on the error signal, wherein the LED controller is operative to adjust the LED signaling means in the positive or negative torque sector to correct the speed of the rotating armature;
   a magnetic position marker on the PC board of the rotating armature; and
   a second stationary magnetic pickup means on the motor for detecting the position marker to determine the position of the armature coils and sending a position feedback signal to the controller for maintaining the set speed.

6. The system defined in claim 5, further comprising at least one magnetic position marker associated with each coil.

7. The system defined in claim 5, wherein the magnetic markers are mounted flat on the armature.

8. The system defined in claim 5, wherein the magnetic markers are mounted on the peripheries of the armature.

9. The system defined in claim 8, further comprising at least one magnetic position marker associated with each coil.

10. A system for controlling the speed of a brushless repulsion motor having a stator and a series of switches mounted on a PC board on the rotating armature for shorting circumferentially spaced armature coils, the system comprising:
    a photo transmitter on the rotating armature for sending a signal to be used for speed control;
    a plurality of alternating reflective and non-reflective markers on the stator for speed control;
    a photo detector on the rotating armature for detecting the speed of the motor via the signal and generating a corresponding speed feedback signal;
    generating means on the rotating armature for generating a speed command signal;
    an error calculator on the rotating armature for comparing the speed feedback and speed command signals and generating an error signal;
    receiving means on the rotating armature for receiving the error signal and for activating and deactivating the switches based upon the error signal;
    a position marker on stator; and
    a second photo detector on the rotating armature for detecting the position marker via the signal to determine the position of the armature coils and for sending a position feedback signal to the receiving means.

11. A speed control system for a brushless repulsion motor having a stator, an armature, and a series of coil switches on a PC board on the armature for shorting a succession of armature coils, the speed control system comprising:
    at least one position marker on the armature for determining armature coil position;
    an LED signaling array for providing an optical signal;
    at least one position detector for detecting the armature coil position marker via the LED array;
    a plurality of markers on the armature for determining armature speed;
    a speed detector for detecting the speed of the armature via the LED array;
    a timer for controlling the speed of the armature and the desired speed of the motor at the precise time as determined by the position of one of the armature coils;
    means for generating a speed command signal;
    an error calculator for comparing the speed feedback arid speed command signals; and
    wherein the speed detector generates a speed feedback signal and the position detector generates a position feedback signal.

12. A speed control system for a brushless repulsion motor having a stator, an armature, and a series of coil switches on a PC board on the armature for shorting a succession of armature coils, the speed control system comprising:
    at least one magnetic position marker on the armature for determining armature coil position;
    an LED signaling array for providing an optical signal for use in activating the coil switches;
    a first pickup means for detecting the magnetic armature coil position marker;
    a plurality of magnetic markers on the armature for determining armature speed;
    a second pickup means for detecting the speed of the armature via the plurality of magnetic markers;
    a timer for controlling the speed of the armature and the desired speed of the motor at the precise time as determined by the position of one of the armature coils;
    means for generating a speed command signal;
    an error calculator for comparing the speed feedback and speed command signals; and
    wherein the speed detector generates a speed feedback signal and the position detector generates a position feedback signal.

13. A speed control system for a brushless repulsion motor having a stator, an armature, and a series of coil switches on a PC board on the armature for shorting a succession of armature coils, the speed control system comprising:
    generating means on the motor for generating coded signals for speed control;
    transmitting means on the motor for transmitting the coded signals to the armature;
    receiving means on the armature for receiving the coded signals;
    decoding means on the armature for decoding the coded signals; and
    activation means on the armature for activating and deactivating the coil switches.

14. The speed control system defined in claim 13, wherein the transmitting means comprises an RF transmitter.

15. The speed control system defined in claim 14 wherein the receiving means comprises an RF receiver.

16. The speed control system defined in claim 14, wherein the receiving means comprises a tuned receiving coil.

17. The speed control system defined in claim 16, further comprising an encoder for position feedback.

18. A system for controlling the speed of a brushless repulsion motor having a stator and a series of switches mounted on a PC board on the rotating armature for shorting circumferentially spaced armature coils, the system comprising:
    a plurality of magnetic markers on the stator for speed control;
    first pickup means on the rotating armature for detecting the magnetic markers and for generating a speed feedback signal;
    generating means on the rotating armature for generating a speed command signal;
    an error calculator on the rotating armature for comparing the speed feedback and speed command signals and for generating an error signal;
    receiving means on the rotating armature for receiving the error signal and for activating and deactivating the switches based upon the error signal;
    a magnetic position marker on the stator; and
    second pickup means on the rotating armature for detecting the magnetic position marker on the rotating armature to determine the position of the armature coils and for sending a position feedback signal to the receiving means.

* * * * *